Figure 1:
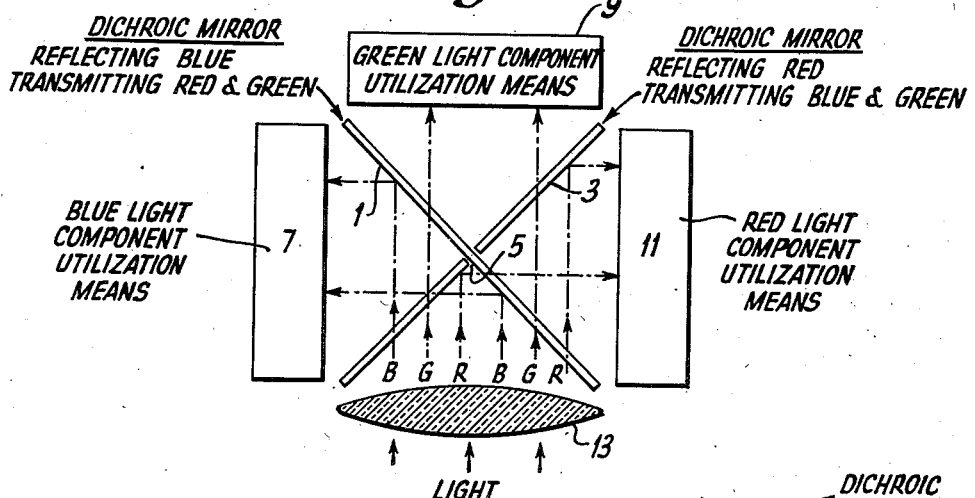

June 16, 1953 — A. C. SCHROEDER — 2,642,487

COMPONENT COLOR SEPARATOR

Filed Feb. 28, 1947

INVENTOR.
ALFRED C. SCHROEDER
BY
ATTORNEY

Patented June 16, 1953

2,642,487

UNITED STATES PATENT OFFICE 2,642,487

COMPONENT COLOR SEPARATOR

Alfred C. Schroeder, Feasterville, Pa., assignor to Radio Corporation of America, a corporation of Delaware Application February 28, 1947, Serial No. 731,647

1 Claim. (Cl. 340—370)

This invention relates to component color separation and more particularly to a compact device employing dichroic mirrors to break light into selected component colors or to combine selected component colored light to form a predetermined color.

In a paper by G. L. Dimmick entitled "A New Dichroic Reflector and Its Application to Photocell Monitoring Sytems" appearing in the "Journal of the Society of Motion Picture Engineers," volume 38, January 1942, on pages 36–44, there is shown and described a selective reflector which can advantageously be employed for breaking light into certain selected component colors. Although it is unnecessary to here repeat the paper, the operation of this invention in one of its preferred forms will be more readily understood after a brief explanation of the operation of a color selective reflector.

It has been known for some time that thin films of some materials are selective in their ability to reflect and transmit light. A thin film of gold is quite transparent to green light and shows strong selective reflection for the red and yellow region. Many aniline dyes appear to have one color when viewed by reflected light and another color when viewed by transmitted light. The material possesses what is known as a surface color, and the transmitted light gets its color by being deprived of certain rays by reflection at the surface and certain others by absorption in the interior.

There is another type of selective reflector which depends upon the interference of light in thin films. This type is far more efficient because the absorption is usually negligible. In its simplest form, this reflector consists of a single thin film between two transparent media. A soap bubble and a layer of oil in water are perhaps the most commonly experienced examples of this type.

If it is desired to make use of the interference principle to obtain a selective reflector capable of reflecting a large percentage of light in the narrow region of the spectrum, it is found that a single thin film would be inadequate for the purpose. Both the intensity and the purity of reflected light may be increased through the use of multiple films arranged in alternate layers having different indices of refraction.

By employing a plurality of such selective reflectors, each having different light transmission and light reflective characteristics, an efficient light splitter or component color combiner may be provided.

According to this invention, a plurality of dichroic mirrors are efficiently positioned to intersect each other and to extend on both sides of the other in the light path such that the light path passes through the dichroic mirrors about their intersection.

Although many applications of the use of dichroic mirrors for light splitting have been proposed, their employment in the form shown and described in this invention is particularly applicable to colored image transforming systems, such as, for example, photography or the transmission by electricity of images in substantially their natural color.

Transmission of visual information by electricity can be accomplished, as is well known, by analyzing an image into its image elements and deriving therefrom a signal train of impulses by a predetermined orderly sequence of scanning. The image may then be reproduced at a remote location by reconstruction in the same predetermined orderly sequence of scanning.

It is also well known in the optical art that the reproduction of images in color may be accomplished by additive methods, that is, by breaking down the color image into a selected number of primary or component colors which are three in number for a tricolor system or, for a low degree of fidelity of color representation, even a bicolor system might be employed.

It follows that color images may be transmitted by electricity by analyzing the color image into not only its image elements, but by also analyzing the color image into its primary or component colors and deriving therefrom a signal train of impulses representative of each of the component colors.

Color images may then be reproduced at a remote position by appropriate reconstruction from the component color signal trains. This may be accomplished by either of two fundamental systems of multiple image transmission which have become commonly known as the sequential and the simultaneous systems of color image transmission.

The sequential system transmits one component color image at a time and in sequence with other component color images and at a rapidly recurring rate.

The simultaneous system transmits through three separate signal channels all the component color image signals simultaneously.

The present invention lends itself particularly well to the transmission of color images by either the aforementioned sequential or simultaneous methods.

In presently used sequential color television processes, a single iconoscope or other form of storage type camera tube (such as the so-called image iconoscope, the orthicon or the image orthicon) is exposed in succession to images giving color separation corresponding to the various selected component colors. During the period the camera tube is exposed to each color component image, the mosaic is concurrently scanned in well-understood manner to enable the transmission of signals representing the corresponding color separation image.

In the conventional sequential multicolor television receiver, a kinescope or image producing tube is used to recreate the image likeness. A black and white image is produced thereon which corresponds to each given color component, this image being viewed or projected through a color filter of a component color corresponding to the desired component color instantaneously to be represented, and such an image representation persists substantially only during the period of the scanning of the fluorescent screen of the kinescope for that color component image. The process is then repeated for the next color component, and so on, with different component color filters successively coming between the tube screen and the observer, thus a brief flashing of each color component image recurs sequentially with spaces in between which are filled by the brief presentation or flashing of other color component images. An experimental sequential color television system is shown and described in an article entitled "An Experimental Color Television System" by R. D. Kell, G. L. Fredendall, A. C. Schroeder, and R. C. Webb, beginning on page 141 of the "RCA Review" for June 1946.

The simultaneous method of image transmission referred to employs many of the fundamental television principles involved in the sequential method, except that video signals representative of each of the selected primary or component colors are transmitted simultaneously over separate signal channels. This, of course, requires three separate component color image pickup devices and three separate component color image reproducing devices which are positioned in registry to produce by the additive process a color image.

The simultaneous method of image transmission lends itself particularly well to all-electronic devices. An all-electronic simultaneous color television system is shown and described in an article entitled "All-Electronic Color Television," beginning on page 6 of "Radio Age" for January 1947. Simultaneous color television systems are also shown and described in an article entitled "Simultaneous All-Electric Color Television," beginning on page 459 of "RCA Review" for December 1946; and in an article entitled "Two Systems of Color Television" by Donald G. Fink, beginning on page 72 of "Electronics" for January 1947.

In No. 2,560,351, dated July 10, 1951, and entitled "Simultaneous Color Television" of Ray D. Kell and George C. Sziklai, Serial No. 716,256, filed December 14, 1946, there has been disclosed a system for simultaneous transmission and reproduction of television images employing dichroic mirrors for the splitting or separating of light into its several primary or component colors. The advantages gained in efficiency and otherwise by the employment of dichroic mirrors have been referred to in the above identified application, and need no further explanation here.

According to this invention, dichroic mirrors are positioned in an extremely compact arrangement to provide for maximum utilization efficiency. The employment of short focal length lenses is made possible, and space, which is often a primary consideration in both image pickup and image reproduction devices, has been utilized to a maximum efficiency.

Accordingly, a primary object of this invention is to provide an improved component color separator.

Another object of this invention is to provide an efficient and compact light splitter for employment in separation of light into its component colors or combining component colors to form a desired color.

Still another object of this invention is to provide an improved color television system.

Figure 2:
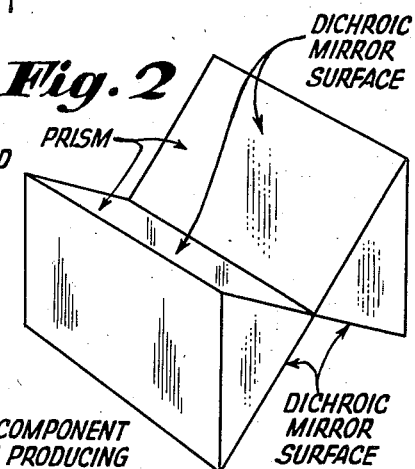
Figure 3:
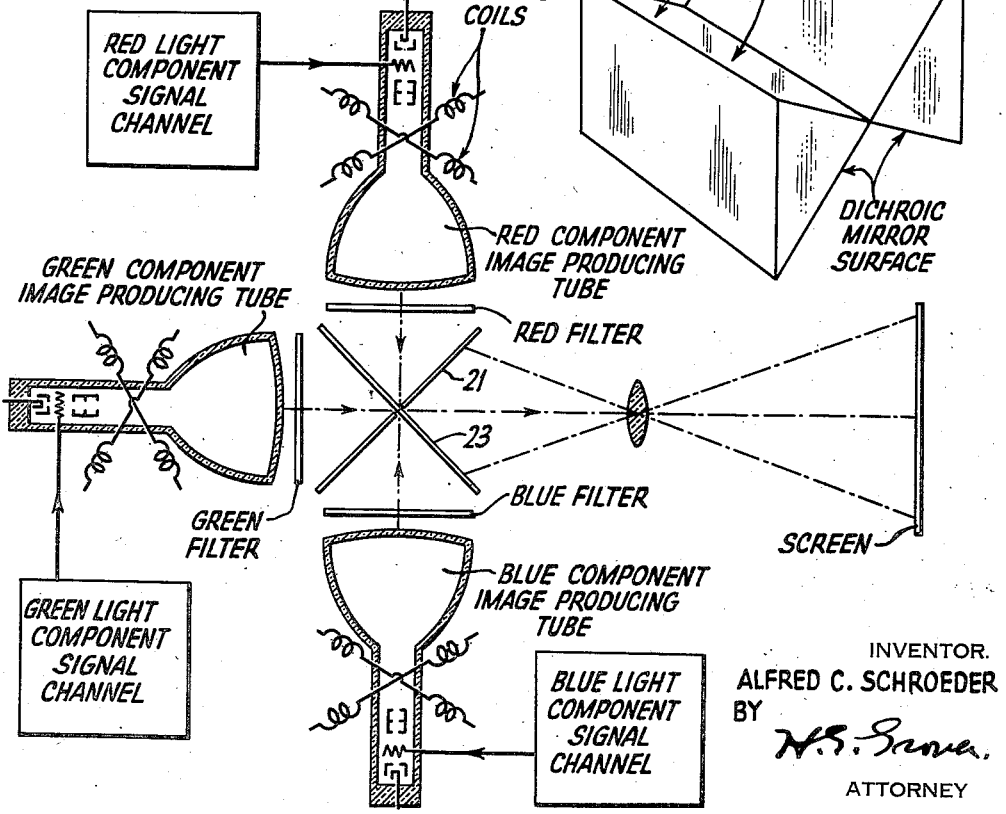

Other and incidental objects of the invention will be apparent to those skilled in the art from a reading of the following specification and an inspection of the accompanying drawing in which Figure 1 shows schematically one preferred form of this invention;

Figure 2 shows by an isometric view another preferred form of this invention; and Figure 3 shows schematically still another preferred form of this invention.

Turning now in more detail to Figure 1, there is shown a plurality of dichroic mirrors 1 and 3, each of which extend, as illustrated, beyond intersection 5. The angle at which the mirrors 1 and 3 are positioned is governed by the desired light characteristics.

If, for example, the dichroic mirror 1 is provided with a coating which is reflective to blue and transparent to red and green, and dichroic mirror 3, on the other hand, is coated with a material reflective to red and transmissive to blue and green, a light path passing through the mirrors, as indicated by the arrows, will be broken down into its component colors of blue, green and red.

If a blue light component utilization means 7 is positioned in the resultant blue light component path and a green light component utilization means 9 is positioned in the split light path transmitting the green light component, and likewise a red light component utilization means 11 is positioned in the red split path portion of the light path, the light entering through lens 13 in the light path may be broken down into its component colors.

The details of the surface coating of the mirrors 1 and 3 are not a subject of this invention, but for the purpose of a more detailed description of dichroic mirror surfaces and their formation, reference is made to previous art, including the article by G. L. Dimmick entitled "A New Dichroic Reflector and Its Application to Photocell Monitoring Systems," beginning on page 36 of the "Journal of the Society of Motion Picture Engineers" for January 1942 and referred to above, and the following U. S. Patents issued to G. L. Dimmick:

| Patent No. | Date |
| --- | --- |
| 2,352,085 | June 20, 1944. |
| 2,360,403 | October 17, 1944. |
| 2,371,611 | March 20, 1945. |
| 2,379,790 | July 3, 1945. |
| 2,392,978 | January 15, 1946. |
| 2,399,860 | May 7, 1946. |
| 2,408,614 | October 1, 1946. |

Although the surfaces 1 and 3 are indicated as straight, they may be curved to provide for other desirable characteristics such as light concentration and more uniform light transmission.

Although the illustration shown in Figure 1 utilizes only a pair of mirrors 1 and 3, it will be seen that two or more mirrors may be employed having one or more lines of intersection.

There is shown in Figure 2 another preferred form of this invention wherein a pair of prisms are positioned such that their apexes are adjacent each other and having dichroic mirrors on their surfaces adjacent each of their apexes.

It will be seen that a light entering, for example, the left hand side of Figure 2 will be split, as illustrated in detail under Figure 1. In still another preferred form of this invention, another pair of prisms can be inserted in the arrangement shown in Figure 2 such that the additional pair of prisms also have their apexes intersecting the apexes of the two prisms shown in Figure 2. This will result, so to speak, in a solid block of glass or other transparent material having dichroic mirror surfaces in its interior.

In Figure 3, there is shown still another preferred form of this invention involving a specific application of one form of light splitter constructed in accordance with this invention.

The dichroic mirrors 21 and 23 are positioned together with appropriate red, green and blue filters, as illustrated. It will be understood that the filters shown are optional and may be employed to increase the efficiency of the light separator.

There is positioned adjacent each of the filters an image producing tube adapted to produce a scanning raster on its image surface representative of each of the component colors of a scanned object. In order to further increase the color efficiency, color producing phosphors may be used on the image surfaces. The scanning raster referred to may be of the sequential type or of the simultaneous type. It becomes apparent, however, that the arrangement illustrated is particularly adaptable to the preferred all-electronic simultaneous type of image transmission.

The details regarding the construction and operation of the component color image producing devices shown are well described in the art in such articles, for example, as the one entitled "Simultaneous All-Electronic Color Television" beginning on page 459 of "RCA Review" for December 1946, referred to above.

Although an image reproducing device is illustrated in Figure 3, it at once becomes obvious that there may be substituted for the red, green and blue component image producing tube a component light utilization means such as a photoelectric device, each of which is connected to separate signal train transmission channels. The screen illustrated in Figure 3 may then become the object upon which a scanning raster may be projected. Details of such an arrangement are known to the art and may be found, for example, in the Patent No. 2,560,351 of R. D. Kell and G. C. Sziklai entitled "Simultaneous Color Television," and referred to above.

Having thus described the invention, what is claimed is:

In a color television system, an optical system comprising in combination a lens, a pair of intersecting dichroic reflectors, one of said reflectors of the type which reflects only blue light and the other of said reflectors of the type which reflects only red light, each of said intersecting dichroic reflectors positioned to extend on both sides of the other intersecting dichroic reflector, a plurality of electron targets all cooperatively positioned with said dichroic reflectors to be in the similarly color designated light path.

ALFRED C. SCHROEDER.

References Cited in the file of this patent

UNITED STATES PATENTS

| Number | Name | Date |
|---|---|---|
| 1,696,739 | Televen | Dec. 25, 1928 |
| 1,843,007 | Troland | Jan. 26, 1932 |
| 1,857,578 | Wright | May 10, 1932 |
| 2,184,999 | Land | Dec. 26, 1939 |
| 2,335,180 | Goldsmith | Nov. 23, 1943 |
| 2,352,777 | Douden | July 4, 1944 |
| 2,373,936 | Wright | Apr. 17, 1945 |
| 2,389,646 | Sleeper | Nov. 27, 1945 |